Oct. 28, 1958
D. ARMOUR, SR
2,857,678
BRICKLAYER'S SPACING LEVEL
Filed July 24, 1953
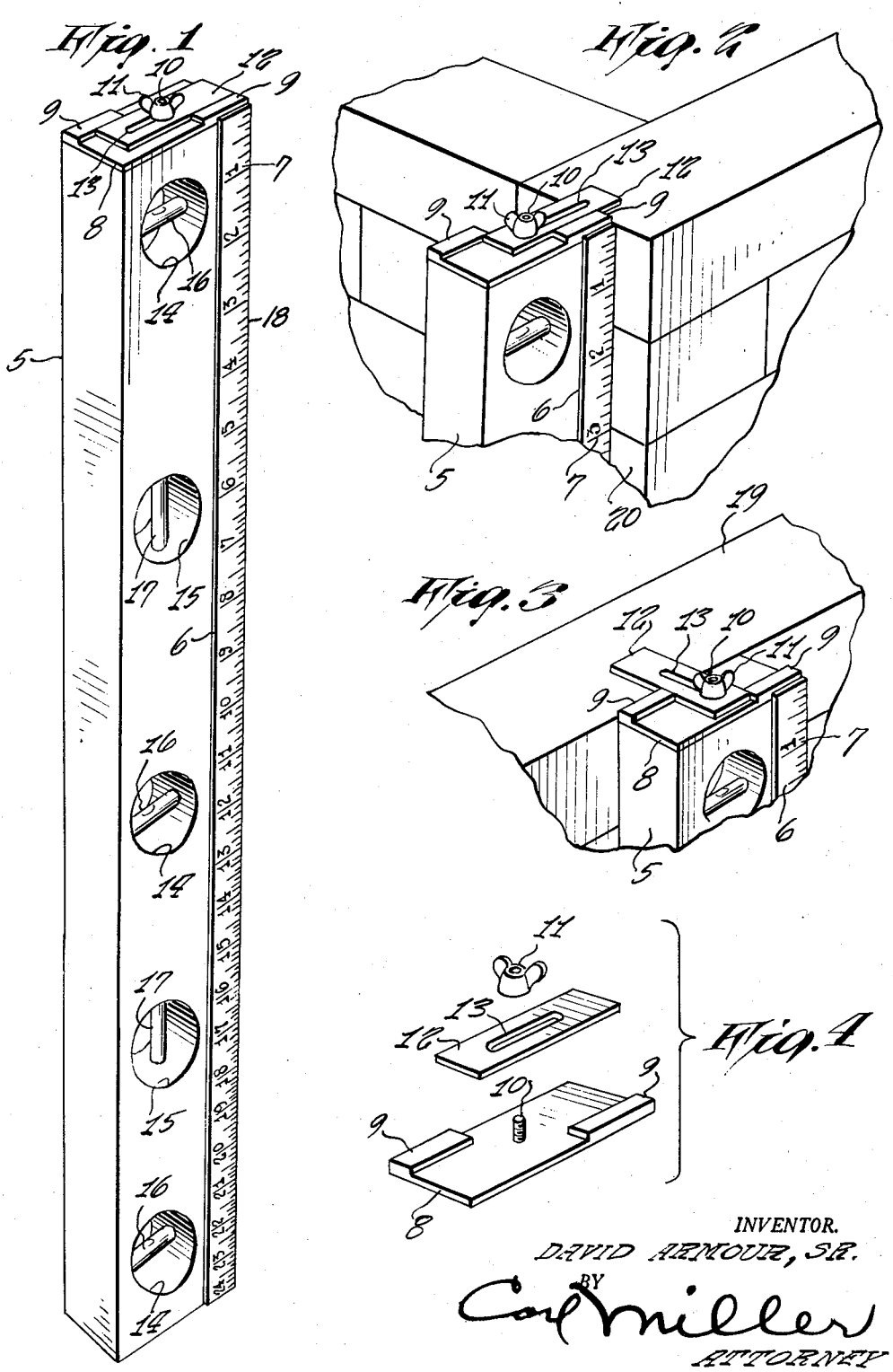
INVENTOR.
DAVID ARMOUR, SR.
BY
Carl Miller
ATTORNEY

United States Patent Office 2,857,678
Patented Oct. 28, 1958

2,857,678

BRICKLAYER'S SPACING LEVEL

David Armour, Sr., Utica, N. Y.; David Armour, Jr., executor of said David Armour, Sr., deceased Application July 24, 1953, Serial No. 370,152

2 Claims. (Cl. 33—207)

The present invention relates to levels and scales, and the like, preferably for use by bricklayers, and refers particularly to a bricklayer's spacing level.

The main object of my invention is to provide a special tool or instrument for use by bricklayers, carpenters and others for ascertaining how accurately vertical and level a wall section may be and for spacing off courses of bricks while laying the brick, as well as measuring off wall portions, boards and the like.

Another object of the invention is to have a special type of level by means of which the level and plumb conditions of a wall or course of bricks may be directly observed at a glance.

A further object of my invention is to have such a level provided with an adjustable and retractible end guide member for engaging upon the top or end of a wall or other object in order to properly locate the level for a correct reading of the condition of the wall.

It is, of course an object to have such a level that is compact and sturdy in construction, convenient to use while being capable of use for several purposes, and reasonable in cost in order to encourage wide distribution on the market.

Other objects and advantages of my invention will appear in further detail as the specification proceeds.

In order to facilitate ready comprehension of this invention for a proper appreciation of the salient features thereof, the invention is illustrated on the accompanying drawing forming part hereof, and in which:

Figure 1 is a perspective view of a level made according to the invention and embodying the same in a practical form;

Figure 2 is a fragmentary perspective view showing a typical application of the spacing level to a wall corner for indicating and/or measuring the same; and Figure 3 is a similar perspective view showing the level in a different condition of adjustment for measuring a wall section.

Figure 4 is a view of the plates on the upper end of the spacing level.

In these views, the same reference numerals indicate the same or like parts.

When laying brick, it is naturally important to save time and cover ground, so that the best possible progress may be achieved in building a wall or like structure. Anything that contributes to this end is of value because building is expensive enough as it is, and it is therefore desirable to use every facility that can in any way lower costs by speeding up work in this field. Thus, by introducing a tool or instrument that adds to convenience in quickly ascertaining the condition of a wall being erected, no time is lost in looking around for two or more different tools for the various operations required by the mason, because a single instrument or device may be used for all purposes of mensuration.

After duly considering this problem, I have succeeded in producing a special bricklayer's or mason's spacing level as already outlined, which will now be described in detail in the following.

Hence, in the practice of my invention, and referring also again to the drawing, an elongated rectangular member 5 of wood or rigid plastic has a scale 6 secured along one edge thereof, with a series of inch marks and numbers marked off upon the same at 7, the arbitrary length in this case being two feet total. Upon the upper end of level member 5 is permanently secured a plate 8, preferably of metal by means of screws or nails, not shown, but this plate can also be made of plastic and cemented on the level member 5, if preferred to metal. The mentioned plate is substantially rectangular in outline and has a pair of diagonally opposite rectangular guide members 9, 9 at two corners of the plate that are formed integral with it, while a threaded stud 10 projects rigidly upward from the center to receive a wing nut 11 thereon.

The two guide members 9, 9 are spaced apart in such manner that an adjustable plate 12 may be located and guided between them as shown in Figure 1 and also in Figure 2. On the other hand, the inner ends of these stops are also so spaced apart transversely of the thickness of member 5 that adjustable plate 12 may be placed transversely as shown in Figure 3, when desired. This adjustable plate has an elongated slot 13 through which stud 10 extends, so that wing nut 11 can be screwed down upon plate 12 in any position thereof and in particular two positions 90° apart (Figs. 2 and 3). Plate 8 thus serves as a base for locating the adjustable plate 12 in its various useful positions.

At several points along level member 5 are provided large apertures 14, 15, etc., in which are fixed the bubble members 16, 17, etc., that are set in parallel or perpendicular positions with respect to the edge 18 of the level. This makes it possible to use the device for ascertaining whether or not the wall 19 is truly up right as gaged in Figure 3 when plate 12 is disposed transversely of the normal position shown in Figure 2, for example. In this pendent position of the level, as well as in that in Figure 1, the bubble members 16 show whether or not the wall 19 or wall corner 20 are truly vertical, the plate 12 extending beyond the outline of the level member 5 in each case, and projecting over the edge of the wall while the level as a whole is placed directly against the wall. In such pendent position, the level also serves to properly space the courses of the bricks, as observed along the scale 6.

When the level is laid upon the top of the wall, the bubble members 17 will show whether or not the top is level, this reading being obtained without the use of adjustable plate 12, for it is then preferably withdrawn into retracted position as shown in Figure 1. In any event, by using the level thus described, the mason will not require a short rule from his pocket, a plumb line, or a level of the conventional types, for all these are now replaced by the prseent mason's spacing level. The same may be made in various sizes without changing the relations between the parts or the principles of the device.

Manifestly, variations may be resorted to, and parts and features may be modified or used without others within the scope of the appended claims.

Having now fully described my invention, I claim:

1. A mason's spacing level including an elongated level member comprising a substantially straight longitudinal body member having a plurality of apertures longitudinally spaced apart therein, a bubble level member in each aperture, a first rectangular plate secured to one end of said level, a second substantially smaller rectangular plate rotatably secured to said first rectangular plate, a pair of rectangular stops secured at diagonally opposite sides of said first rectangular plate, and means for securing said second plate in various selected positions of adjustment on said level member, said second plate being rotatable between a position extending in the same direction as the longitudinal axis of said first plate a position extending perpendicular thereto, said second plate when in said selected positions lying in full face engagement with facing sides of said rectangular stops.

2. A mason's spacing level according to claim 1, wherein one bubble member in one aperture is disposed longitudinally of the level body and another bubble member in another aperture is disposed at right angles to the first mentioned bubble member.

References Cited in the file of this patent

UNITED STATES PATENTS

| | | |
|---|---|---|
| 457,992 | Gillette | Aug. 18, 1891 |
| 582,517 | Bellows | May 11, 1897 |
| 928,600 | Greene | July 20, 1909 |
| 1,251,785 | Kemp | Jan. 1, 1918 |
| 1,295,180 | Lowenstein | Feb. 25, 1919 |
| 1,701,069 | Frantz | Feb. 5, 1929 |
| 1,705,182 | Gardner et al. | Mar. 12, 1929 |
| 1,855,394 | Hill | Apr. 26, 1932 |
| 2,611,185 | Thursack | Sept. 23, 1952 |
| 2,645,018 | Waddell | July 14, 1953 |

FOREIGN PATENTS

| | | |
|---|---|---|
| 298,323 | Great Britain | Oct. 11, 1928 |